(12) United States Patent
Sick et al.

(10) Patent No.: US 11,608,599 B2
(45) Date of Patent: Mar. 21, 2023

(54) PRODUCTION OF AN ARTIFICIAL TURF FIBER WITH A NON-CIRCULAR CLADDING

(71) Applicant: Polytex Sportbelage Produktions-GmbH, Grefrath (DE)

(72) Inventors: Stephan Sick, Willich-Neersen (DE); Dirk Sander, Kerken (DE); Ivo Lohr, Kempen (DE)

(73) Assignee: Polytex Sportbelage Produktions-GMBH, Grefrath (DE)

( * ) Notice: Subject to any disclaimer, the term of this patent is extended or adjusted under 35 U.S.C. 154(b) by 307 days.

(21) Appl. No.: 16/755,987

(22) PCT Filed: Nov. 2, 2018

(86) PCT No.: PCT/EP2018/080051
§ 371 (c)(1),
(2) Date: Apr. 14, 2020

(87) PCT Pub. No.: WO2019/086628
PCT Pub. Date: May 9, 2019

(65) Prior Publication Data
US 2020/0308778 A1    Oct. 1, 2020

(30) Foreign Application Priority Data

Nov. 3, 2017    (EP) .................................. 17199894

(51) Int. Cl.
*C08J 3/22* (2006.01)
*D01D 5/08* (2006.01)
(Continued)

(52) U.S. Cl.
CPC ............. *E01C 13/08* (2013.01); *D01D 5/253* (2013.01); *D01D 5/34* (2013.01); *D01D 5/36* (2013.01);
(Continued)

(58) Field of Classification Search
CPC .... C08J 3/22; D01D 1/04; D01D 5/08; D01D 5/12; D01D 5/253; D01D 5/34;
(Continued)

(56) References Cited

U.S. PATENT DOCUMENTS 6,017,479 A  *  1/2000  Helms, Jr. .............. D01D 5/253
                                                           264/210.8
7,378,148 B2     5/2008  Morton-Finger
2008/0280075 A1* 11/2008  Van Reijen ................ D01F 8/12
                                                           428/17
(Continued)

FOREIGN PATENT DOCUMENTS

DE            10307174 A1    9/2004
WO      WO-2015/144223 A1   10/2015
WO      WO-2016129467 A1 *  8/2016  ............... D01D 5/34

OTHER PUBLICATIONS

International Search Report PCT/ISA/210 for International Application No. PCT/EP2018/080051 dated Jan. 14, 2019.
(Continued)

*Primary Examiner* — Leo B Tentoni
(74) *Attorney, Agent, or Firm* — Harness, Dickey & Pierce, P.L.C.

(57) ABSTRACT

A method for producing an artificial turf fiber, comprising:
preparing a core polymer mixture from a core polymer and a thread polymer forming beads within the core polymer;
coextruding the core polymer mixture with a cladding polymer component into a monofilament, the core polymer mixture forming a cylindrical core, The cladding polymer component forming a cladding encompassing the core with a non-circular profile;
quenching the monofilament;
reheating the quenched monofilament;
stretching the reheated monofilament to deform the beads into threadlike regions; and
(Continued)

Figure 1:
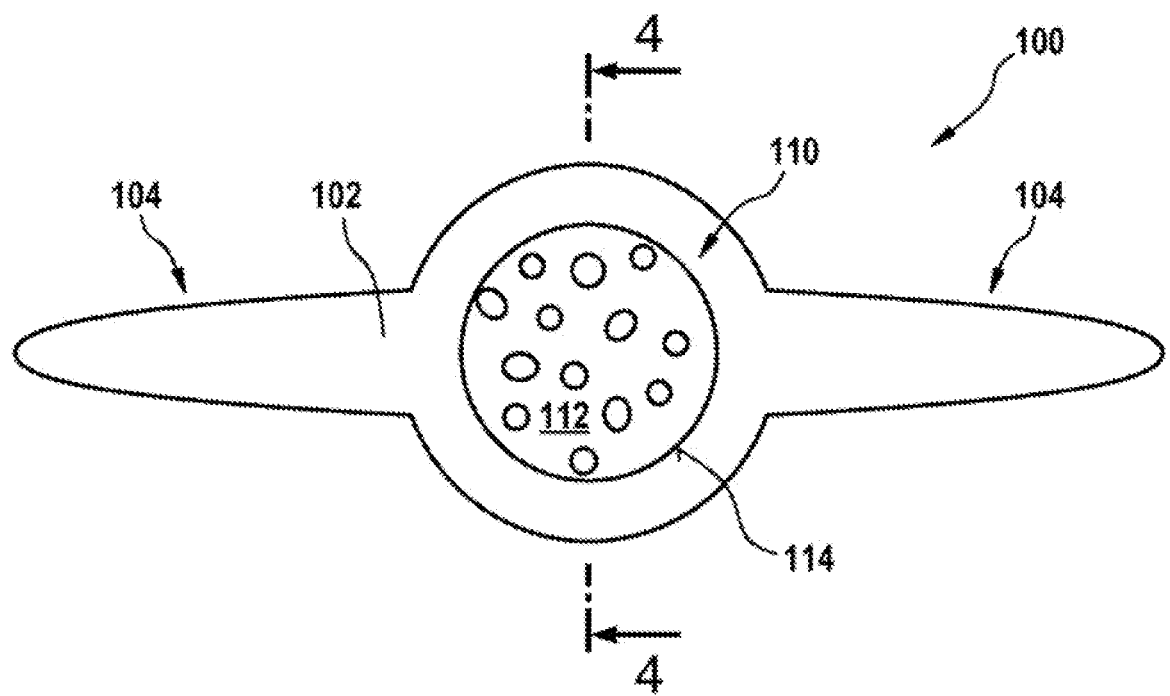

providing one or more of the stretched monofilaments as the artificial turf fiber.

21 Claims, 6 Drawing Sheets

(51) Int. Cl.

| | |
|---|---|
| *D01D 5/12* | (2006.01) |
| *D01F 8/12* | (2006.01) |
| *D01F 8/14* | (2006.01) |
| *D02J 13/00* | (2006.01) |
| *E01C 13/08* | (2006.01) |
| *D01D 5/253* | (2006.01) |
| *D01D 5/34* | (2006.01) |
| *D01F 1/10* | (2006.01) |
| *D01F 8/06* | (2006.01) |
| *D01D 5/36* | (2006.01) |
| *D01F 1/04* | (2006.01) |
| *D01F 1/07* | (2006.01) |

(52) U.S. Cl.
CPC .................. *D01F 1/10* (2013.01); *D01F 8/06* (2013.01); *D01F 1/04* (2013.01); *D01F 1/07* (2013.01); *D10B 2505/202* (2013.01)

(58) Field of Classification Search
CPC ..... D01D 5/36; D01F 8/12; D01F 8/14; D02J 13/00; D10B 2505/202
USPC ............ 264/172.12, 172.13, 172.15, 172.17, 264/172.18, 177.13, 210.8, 211.14
See application file for complete search history.

(56) References Cited

U.S. PATENT DOCUMENTS

| | | | |
|---|---|---|---|
| 2010/0173102 A1* | 7/2010 | Van Reijen | ........... D06M 15/05 264/172.15 X |
| 2012/0125474 A1 | 5/2012 | Frenken et al. | |
| 2012/0189785 A1 | 7/2012 | Rossing et al. | |
| 2015/0190885 A1* | 7/2015 | Salzbrunn | ............... B26F 3/004 219/121.72 |
| 2018/0030622 A1* | 2/2018 | Masuda | ................. D01D 5/253 |

OTHER PUBLICATIONS

Written Opinion of the International Searching Authority PCT/ISA/237 for International Application No. PCT/EP2018/080051 dated Jan. 14, 2019.

Rudolf Hufenus et al, "Design and Characterization of a Bicomponent Melt-Spun Fiber Optimized for Artificial Turf Applications", Macromolecular Materials and Engineering, Aug. 24, 2012 (Aug. 24, 2012).

International Preliminary Report on Patentability and Written Opinion thereof dated May 5, 2020 for corresponding International Application No. PCT/EP2018/080051.

Office Action for European Application No. 18 793 443.5 dated Aug. 31, 2022.

* cited by examiner

PRODUCTION OF AN ARTIFICIAL TURF FIBER WITH A NON-CIRCULAR CLADDING

CROSS-REFERENCE TO RELATED APPLICATIONS

This application is a national phase under 35 U.S.C. § 371 of PCT International Application No. PCT/EP2018/080051 which has an International filing date of Nov. 2, 2018, which claims priority to European Patent Application No. 17199894.1, filed Nov. 3, 2017, the entire contents of each of which are hereby incorporated by reference.

FIELD OF THE INVENTION

The invention relates to the production of synthetic fibers, and more specifically, of artificial turf fibers resembling grass blades. The invention further relates to producing artificial turf, which is also referred to as synthetic turf.

BACKGROUND AND RELATED ART

Artificial turfs are a class of polymer-based floor textiles which imitate natural grass in its visual appearance and physical properties. They are normally manufactured from synthetic fibers which are fixed to a synthetic carpet background. The synthetic fibers imitate natural grass blades and are formed from one or more extruded monofilaments. Mono or bi-component monofilaments are known from the state of the art to be used as basic materials for the production of artificial turf fibers.

High quality artificial turf fibers should give a faithful reproduction of the qualitative behavior (e.g. visual appearance, wetting behavior) of natural grass. An important demand in this respect is resilience, with the ability of the pile to recover from compression as it typically occurs during use of the artificial turf, e.g. after being trodden by ball game players. For this purpose, monocomponent artificial turf fibers are manufactured from polymers such as polyamide which provide sufficient mechanical stiffness and elasticity.

In addition, high quality artificial turf fibers should fulfill the requirement of providing a soft, elastic outer surface to gain a closer resemblance of natural grass blades and reduce the risk of injuries which may occur upon high velocity body contact with the artificial turf fibers. This may be achieved by wrapping or coating a resilient core fiber as a semifinished part with a layer of an appropriate synthetic material such as polyethylene. A more sophisticated manufacturing technology is coextrusion, where the materials for the core fiber and the elastic cladding are joined together in a fluid phase. As high mechanical forces and harsh environmental conditions act upon an artificial turf, the coating of the bicomponent fiber may wear off or the cohesion between core and cladding may get lost through delamination or splicing. A coextrusion technology addressing this drawback has been proposed in DE 10307174 A1, where a multilayer monofilament is disclosed with a third polymer component interfacing the core and the cladding to increase cohesion.

WO 2015/144223 A1 discloses a method of manufacturing artificial turf, the method comprising the steps of: creating a polymer mixture, wherein the polymer mixture is at least a three-phase system, wherein the polymer mixture comprises a first polymer, a second polymer, and a compatibilizer, wherein the first polymer and the second polymer are immiscible, wherein the first polymer forms polymer beads surrounded by the compatibilizer within the second polymer; extruding the polymer mixture into a monofilament; quenching the monofilament; reheating the monofilament; stretching the reheated monofilament to deform the polymer beads into threadlike regions and to form the monofilament into an artificial turf fiber; incorporating the artificial turf fiber into an artificial turf carpet.

The publication "Design and Characterization of a Bicomponent Melt-Spun Fiber Optimized for Artificial Turf Applications" by R. Hufenus et al., Macromol. Mater. Eng. 298: 653-663, https://doi.org/10.1002/mame.201200088, discloses results of a comparative study of bicomponent artificial turf fibers with different cross sections, some of which comprising a cylindrical core surrounded by a cladding with a non-circular profile.

INVENTION SUMMARY

The invention provides for a method for producing artificial turf fibers with improved biomimetic properties, as well as producing artificial turf from these artificial turf fibers.

In one aspect, the invention relates to an artificial turf fiber comprising at least one monofilament, each of the at least one monofilament comprising a cylindrical core and a cladding, the core comprising a core polymer and threadlike regions, which are formed by a thread polymer and embedded in the core polymer, the cladding surrounding the core and having a non-circular profile and being formed by a cladding polymer which is miscible with the core polymer.

In general, the core-cladding structure may have the advantage that the core may be optimized to provide properties, such as a certain degree of elasticity or rigidity, which are desirable for each blade of artificial turf as a whole, while the cladding can be designed with specific surface properties such as softness and visual appearance. Particularly, the core may comprise a core polymer and/or a thread polymer which provides sufficient rigidity to the artificial turf fiber that the desired resilience of artificial turf blades manufactured from these artificial turf fibers are achieved. For the particular case that a soft cladding polymer is selected and the core polymer is the same polymer as the cladding polymer, the resilience of the artificial turf fiber arises from the threadlike regions alone and the thread polymer should be chosen accordingly.

The miscibility of the core polymer and the cladding polymer may render additional interfacing materials for providing a sufficient amount of cohesion between core and cladding unnecessary. During manufacturing from a fluid state, the core polymer and the cladding polymer may mix with each other, forming a quasi-monolithic transition zone between core and cladding which provides a mechanical stability which is comparable to monocomponent fibers.

The non-circular profile of the cladding may increase the surface-to-mass ratio for each artificial turf fiber compared to purely circular-cylindrical fibers if a suitable non-circular geometry is selected. An artificial turf manufactured from these artificial turf fibers may thus feature an improved coverage per unit area, which would conventionally be achieved by manufacturing the artificial turf with a higher blade density. According to embodiments of the invention, the improved coverage can be achieved with lower polymer consumption, which may result in reduced manufacturing costs. According to embodiments, the finished bicomponent artificial turf fiber has a yarn weight between 1200 and 2300 dtex.

Each monofilament is a cylindrical polymer fiber, where the term "cylindrical" denotes a general right cylinder, i.e.

having its primary axis oriented perpendicular to its base plane or cross section. Specifically, each fiber produced can be a non-circular cylinder, i.e. having a non-circular cross section. Examples of a non-circular cross section include an ellipse or a polygon. It is understood that the cross sections of core and cladding may be selected independently from each other, and that each of the core and the cladding may have a non-circular cross section. In a non-limiting example, an elliptical core is surrounded by a bean-shaped cladding. In another non-limiting example, the fiber has a circular core and a cladding with two protrusions extending away from the core with a length of at least the core diameter.

According to embodiments, the profile of at least one of the protrusions comprises an undulated section spanning at least 60% of one side of said at least one protrusion. An undulated section is understood here as a part of the fiber profile which comprises a repetitive element that is small compared to overall dimensions of the fiber. For the scope of the present invention, this is considered to be the case if at least two instances (i.e. one repetition) of the repetitive element fit on each of the at least one undulated protrusion, and its amplitude, for each of the at least one undulated protrusion, is not more than 25 percent of a maximum thickness of said protrusion.

Undulation may increase the surface-to-mass ratio further and therefore contribute to the benefits mentioned above. Another advantageous effect may be an increase in diffuse light scattering of artificial turf produced from artificial turf fibers with the undulated profile compared to fibers having a smooth surface. In addition, undulation may increase resilience of the fiber. Undulation may also decrease adhesion of liquids (e.g. rain water) to the fiber by providing guiding edges to droplets, i.e. undulation may increase fiber surface while decreasing liquid contact surface.

Artificial turf produced from artificial turf fibers with the undulated profile may therefore be produced more efficiently and have a shorter drying time during usage.

According to embodiments, the undulated section spans one side of the non-circular profile and the non-circular profile comprises no further undulated sections apart from the undulated side. In an example, the fiber is double-sided, comprising one smooth face (smooth side of the profile, e.g. straight or concave) and one grooved face (undulated side). In addition to the aforementioned general advantages of undulation, a single-sided undulation may be a closer approach to blade structures found with natural grass, which may contribute beneficially to the properties of an artificial turf manufactured with such fibers. In such artificial turf, a portion of the grooved face of each fiber may be surfacing the turf in a stochastic distribution. This may give the turf a less homogeneous and matted appearance. In addition, using such turf e.g. for athletic activities may locally give the artificial grass blades a defined orientation, such that the oriented contact area becomes easily discernable from its stochastically oriented environment.

A "thread polymer" is understood here as any polymer which can be used to form threadlike regions within the core of a stretched bicomponent monofilament according to embodiments of the invention. The thread polymer is preferably chosen to exhibit a high bending stiffness after being stretched into threadlike regions as described herein. The bending stiffness may be sufficiently high that no further means are needed to provide a desired level of resilience to an artificial turf fiber manufactured from the monofilament. In solid form, the thread polymer may differ from the core polymer and/or the cladding polymer with regard to rigidity, polarity and/or density.

A "core polymer" may be any polymer which can be used to embed beads or threadlike regions of a thread polymer to form the core of a monofilament according to embodiments of the invention. The core polymer is preferably not miscible with the thread polymer, but at least partially miscible with the cladding polymer. If an immiscible combination of thread polymer and core polymer is chosen, the core polymer is preferably selected such that the thread polymer can be embedded into the core polymer using a compatibilizer polymer interfacing the thread polymer and the core polymer. Preferably, an inexpensive polymer is chosen as the core polymer as it is supposed to form the largest portion of the core by mass and/or volume.

The term "cladding polymer" is used here to refer to any polymer which can be used to surround a core strand formed by a core polymer and a thread polymer to form a monofilament according to embodiments of the invention. The cladding polymer should be miscible with the core polymer in fluid state. The cladding polymer is preferably chosen to exhibit soft and smooth haptic properties as it is supposed to form the outer layer, or cladding, of an artificial turf fiber according to embodiments of the invention. Furthermore, a preferred cladding polymer is suitable for coextrusion with a second component formed by a mixture of core polymer and thread polymer. Preferably, the cladding polymer is an inexpensive polymer as it is supposed to form a major portion of the total mass or volume of a monofilament according to embodiments of the invention.

The core of the artificial turf fiber, or the liquid core polymer mixture from which the core is formed during manufacturing, is at least a two-phase system comprising the thread polymer as a first one of the at least two phases, and the liquid core polymer as a second one of the at least two phases.

The thread polymer and the core polymer are two chemically different polymers. In any case, each of the core polymer and the thread polymer form a phase, i.e. a continuous volume filled with a plurality of molecules of the respective polymer. In this sense, any beads or threadlike regions formed from the thread polymer are phases embedded in the phase formed by the core polymer. More precisely, the term "threadlike region" is not to be understood as a single stretched polymer molecule, but rather as a continuous filament filled with a plurality of thread polymer molecules.

According to embodiments, the liquid core polymer mixture, or respectively, the core, is a two-phase system, i.e., the core is free of the compatibilizer. A two-phase core may have the advantage that no compatibilizer is needed for interfacing thread and core polymer if they are incompatible. The thread polymer may form an embedded structure within the matrix of even an incompatible core polymer by mechanically dispersing the thread polymer within the liquid core polymer.

Core polymer and cladding polymer may be different or identical polymers. According to embodiments, core polymer and cladding polymer may be different forms of the same polymer. More particularly, a preferred choice both for the core polymer and the cladding polymer is polyethylene. In one embodiment, the core polymer is high-density polyethylene (HDPE) and the cladding polymer is linear low-density polyethylene (LLDPE). In liquefied form, this combination may feature a high miscibility with each other as well as rheological properties which are optimized for forming a firm bond between core and cladding by means of coextrusion. When formed into a monofilament for producing an artificial turf fiber according to embodiments of the invention, the two solidified polymers may provide further advantages: HDPE is denser and more rigid than LLDPE, which may thus add to the resilience of the artificial turf fiber, while LLDPE is soft and wear resistant, which may provide a reduced risk of injury and amended durability.

The invention recognizes that an artificial lawn may have advantageous technical and/or qualitative properties (such as its visual or haptic appearance or its behavior during sportive usage) if the fibers which make up its pile are equipped with biomimetic traits, i.e. if they imitate the structural components and/or features of natural grass, particularly the outline of a normal cross section of a grass blade. In an embodiment, the profile represents the cross section of a grass blade of the genus *Lolium*.

According to embodiments, the cladding forms two protrusions which extend from the core in opposite directions. The two protrusions of the cladding may give the artificial turf fiber a structure with a closer resemblance of blades of natural grass. This may result in a more natural appearance as well as characteristics for the artificial turf which imitate the physical characteristics of a natural lawn during usage more realistically.

According to embodiments, the profile of at least one of the protrusions comprises a concave side. Compared to protrusions with straight sides, this may reduce the cross-sectional area of the fiber while slightly increasing its perimeter. Therefore, protrusions comprising a concave side may increase the surface-to-mass ratio further, to the beneficial effects described before. Preferably, the curvature of the concave side is limited such that the thickness of the at least one concavely tapered protrusion is smallest at the edge of the fiber, i.e. the protrusions should contain no "bottleneck" which might reduce mechanical stability of the fiber.

According to embodiments, the cladding is a hydrophobic polymer. This may yield a shorter drying time for a resulting artificial turf after humid weather conditions (e.g. rain or dew) or cleaning, which may improve its playability in turn.

According to embodiments, the cladding is joined to the core by a contact layer, and the contact layer consists of a mixture of the core polymer and the cladding polymer. During production of the artificial turf fiber, a core polymer and the cladding polymer are heated to a liquid state. When these two miscible polymers come into contact, they will mix with each other in an interfacing zone herein referred to as "contact layer". When the monofilament precursor thus formed is cooled down, the two polymers solidify so that the contact layer forms a solid connection between both components which is void of any contact surface. The contact layer forms a three-dimensional structure which comprises a gradual transition of polymer types. In some embodiments, the number density of core polymer molecules gradually decreases from the core outward and the number density of cladding polymer molecules analogously decreases from the cladding inward. In the special case of identical core and cladding polymers, the number density of polymer molecules remains constant, while only the concentration of additives which may be present in only one of the interfacing components forms a gradient towards the respective other component.

Hence, core and cladding are connected by a substance-to-substance bond formed by a polymer mixture which is held together by intermolecular forces which may be stronger than purely adhesive forces acting across two different adjacent, but not intermixed polymers. The two polymers are bonded together in a way which is similar to the intermolecular forces present in a monocomponent fiber. Shear stress occurring during use of an artificial turf manufactured from such fibers will therefore be less likely to delaminate the cladding from the core. An artificial turf according to embodiments of the invention may therefore feature an improved wear resistance.

A stronger connection between core and cladding may also contribute beneficially to the different means described herein for increasing the surface-to-mass ratio of artificial turf fibers according to embodiments and/or artificial turf according to embodiments. A fiber with an increased surface or surface-to-mass ratio may be more susceptible to external forces, an effect which may increase the risk of delamination. However, the contact layer according to embodiments of the invention may counterbalance this effect and therefore enable a larger increase in surface-to-mass ratio as would be possible without it.

Moreover, no compatibilizing polymer is needed to bring core and cladding into cohesive contact. Embodiments of the invention may achieve an equal or stronger cohesion between core and cladding than three-component artificial turf fibers where the third component is a compatibilizer interfacing core and cladding. For this reason, the production of artificial turf fibers according to embodiments of the invention may also result in a simplified production setup as only two components must be brought into contact.

According to embodiments, the thread polymer is immiscible with the core polymer, the core further comprises a compatibilizer surrounding each of the threadlike regions and interfacing the thread polymer and the core polymer. The thread polymer, which is responsible for the resilience of the artificial turf fiber, may be selected from a range of materials which ensure a sufficient degree of stiffness with no regard to miscibility with the core polymer. Therefore, a compatibilizer may be advantageously used to stabilize the emulsion of the thread polymer beads in the core polymer in fluid state during production.

The compatibilizer is a polymer of a specific microscopic structure which enables cohesion of the otherwise immiscible thread polymer and core polymer. Instead, the desired resilience may be achieved by means of the compatibilizer causing the threadlike regions, which can be formed from the stabilized beads by stretching the monofilament after coextrusion, to stay fixed in the core polymer matrix, forming an embedded structure.

According to embodiments, the compatibilizer is an amphiphilic substance. An amphiphilic substance is capable of connecting polar and non-polar molecules. An amphiphilic compatibilizer may connect molecules of e.g. a non-polar core polymer with molecules of a polar cladding polymer, and vice versa.

According to embodiments, the core polymer is a non-polar polymer.

According to embodiments, the thread polymer is immiscible with the cladding polymer, the cladding is fixed to the core by a contact layer, the contact layer comprises a mixture of the core polymer and the cladding polymer, and the contact layer locally further comprises the compatibilizer as a third component of the mixture.

During manufacturing of the artificial turf fiber, the threadlike regions may be arranged at random radial positions of the core. In particular, it may happen that some of the threadlike regions are locally or completely disposed at the boundary of the core. Threadlike regions from the core boundary may therefore get introduced into the contact layer during the described mixing process.

If the thread polymer is immiscible with the core polymer, the compatibilizer surrounding the threadlike regions may likewise get introduced into the contact layer. If the thread polymer is also immiscible with the cladding polymer, the compatibilizer may have the beneficial effect that the bonding force between core and cladding is not diminished locally in areas where part of the threadlike regions, which cannot mix with the cladding, get introduced into the contact layer. It may, however, be necessary to select a suitable compatibilizer material which is able to provide cohesion of the thread polymer with the core polymer and with the cladding polymer as well.

According to embodiments, the thread polymer is a polar polymer. According to embodiments, the thread polymer is a hydrophilic polymer.

According to embodiments, the thread polymer is one of polyamide, polyethylene terephthalate, polybutylene terephthalate, polyester, and polybutyrate adipate terephthalate, and/or the core polymer and/or the cladding polymer is any one of polyethylene, polypropylene, and a mixture thereof.

Resilience of the artificial turf fiber may be achieved by using merely small portions of a thread polymer with a high bending resistance. Hence, a smaller amount of the mentioned polymers, which are comparably expensive, but may yield the desired level of bending stiffness, may be used compared to fibers where the core is manufactured from the thread polymer as a whole. In contrast, the cladding and the largest portion of the core may be formed by the above-mentioned polymers, which are soft and comparably inexpensive. This may provide for a soft and smooth artificial turf surface, which may be beneficial to reduce the risk of injuries upon high velocity skin contact during usage.

According to embodiments, first ones of the threadlike regions are formed by the thread polymer and second ones of the threadlike regions are formed by an additional thread polymer, the additional thread polymer being different from the thread polymer of the first threadlike regions and being any one of the following: polyamide, polyethylene terephthalate, polybutylene terephthalate, polyester, and polybutyrate adipate terephthalate. This may provide for a precise means of controlling the size and distribution of the threadlike regions using two different polymers.

According to embodiments, the additional thread polymer is a polar polymer.

According to embodiments, the artificial turf fiber comprises:
   the threadlike regions in an amount of 1 to 30 percent by weight of the core, the threadlike regions comprising the thread polymer and, optionally, an additional thread polymer; and/or
   the compatibilizer in an amount of 0 to 60 percent by weight of the core polymer mixture; and/or
   the core polymer in an amount of 20-50 percent by weight of the artificial turf fiber; and/or
   the cladding polymer in an amount of 50-80 percent by weight of the artificial turf fiber.

The mentioned percentage ranges may allow for choosing an optimal material combination where, for instance, the requirements for fiber resilience, surface smoothness, and economic surface-to-mass ratio are balanced.

According to embodiments, the core has a diameter of 50 to 600 micrometers, the cladding has a minimum thickness of 25 to 300 micrometers in all directions extending radially from the core, and each of the protrusions has a radial extension, measured from the perimeter of the core, of the cladding thickness plus 2 to 10 times the radius of the core.

The mentioned ranges for the core diameter and the minimum cladding thickness may allow for an optimized dimensioning of the artificial turf fiber to provide the desired degree of stiffness and a sufficient amount of cladding material surrounding the core to form the mechanically robust contact layer. Said ratio of the radial extension of the protrusions with respect to the core radius may be chosen so as to improve the biomimetic properties of the artificial turf and the surface-to-mass ratio of the artificial turf fibers.

According to embodiments, the threadlike regions have a diameter of less than 50 µm and/or a length less than 2 mm. A proper dimensioning of the threadlike regions may allow for customizing the resilience of the artificial turf fiber to the expected usage conditions. If the threadlike regions are manufactured with a too large diameter, an artificial turf manufactured with the artificial turf fibers might have an inappropriately hard or stiff surface. Another parameter is the length of the threadlike regions: although the thread polymer may be chosen to provide a large bending stiffness compared to the other polymers present in the artificial turf fiber, they may become bendable with a large bending radius if they are too long. In an optimized design, the threadlike regions may be substantially shorter than an overall length of an artificial turf blade and/or the full bending circle of a thread polymer cylinder of a given diameter, but still long enough that the low elasticity of the core polymer is not dominating.

According to embodiments, the core is free of at least one of the following components of the cladding: a wax, a dulling agent, a UV stabilizer, a flame retardant, an antioxidant, a fungicide, a pigment, and combinations thereof. It may be beneficial to use one or more of the mentioned additives only in the cladding where they are actually needed. This may allow for a more cost-effective production as less additives are consumer per unit length of the artificial turf fiber.

According to embodiments, the at least one monofilament is a coextrusion product of a first coextrusion component and a second coextrusion component, the first coextrusion component comprising at least the core polymer and the thread polymer, the second coextrusion component comprising at least the cladding polymer. Forming the monofilaments by extrusion may allow for comparably inexpensive mass production of the artificial turf fibers. The use of coextrusion technology, i.e. bonding the core and the cladding together while being in the fluid phase at the same time, may yield a monofilament with improved protection against delamination or splicing due to shear stress and/or adverse environmental influences.

For example, the bicomponent artificial turf fiber can be manufactured by coextruding the two polymer components through separate channels, e.g. an inner channel receiving the melted core polymer component and an outer channel receiving the melted cladding polymer component joining the components. Upon exiting the separate channels, the two components would be formed to a strand which is pressed through an extrusion opening.

In this scenario, the joining process is responsive to the flow characteristics downstream of the channels. Process parameters, mainly temperature and feed rates, may be chosen such that a balance between laminar flow and turbulent flow is achieved during joining. A purely laminar flow could result in comparably weak adhesive bonding between core and cladding as the molecules from both components would not mix significantly. On the other hand, a pronouncedly turbulent flow could cause instabilities which would destroy the core-cladding structure at least locally. The process parameters were preferably balanced such that a small-scale turbulence would be created where the core and cladding molecules could mix within a thin contact layer of nearly constant width around the core.

The contact layer constitutes a transition zone where the number densities of core polymer and cladding polymer molecules form a gradient. This way, a bond strength between core and cladding may be obtained which surpasses bonding forces which can be achieved by adhesive bonding.

The strand thus formed of the joined components is then pressed through an extrusion opening. The contour of the opening corresponds to the perimeter of the artificial turf fiber monofilament to be produced. Preferably, the extrusion opening comprises two circular or ellipsoidal sections which are located on two opposite sides from the center and which are connected to each other via two long, narrow protrusion gaps located on two further opposite sides from the center. Hence, the center of the joined strand pressed through the opening may comprise the core surrounded by circular or ellipsoidal sections of the cladding, while the protrusion gaps would be filled by the cladding polymer component only. The described opening geometry may therefore yield a monofilament which resembles a blade of natural grass more closely than e.g. a circular-cylindrical monofilament.

After exiting e.g. the coextrusion device, the monofilament may be quenched, e.g. by passing a water quench, and then annealed online, passing e.g. a heating oven and/or a set of heated godets. By this procedure the beads or droplets of the thread polymer, surrounded by the compatibilizer, may be stretched into an axial direction of the monofilament and form small fiber-like, linear structures which may stay completely embedded in the polymer matrix of the core polymer or locally migrate into the contact layer.

Another aspect of the invention relates to an artificial turf comprising a textile backing and multiple ones of the artificial turf fiber according to embodiments of the invention, the artificial turf fibers being incorporated into the artificial turf textile backing.

In some examples the stretched monofilament may be used directly as the artificial turf fiber. In other examples the artificial turf fiber may be a bundle or group of several stretched monofilament fibers which may be cabled, twisted, or bundled together. In some cases the bundle is rewound with a so called rewinding yarn, which keeps the yarn bundle together and makes it ready for the later tufting or weaving process.

According to embodiments, the artificial turf fiber forms a pile on one side of the artificial turf backing, wherein each of the artificial turf fibers extends a predetermined length into the pile and the threadlike regions have a length less than one half of the predetermined length.

According to embodiments, each of the monofilaments and/or the artificial turf fibers are fixed to the backing at a random radial orientation. A random orientation may yield an artificial turf with improved pliability characteristics. As an example, the formation of a slippery surface by the artificial turf blades is more likely for an artificial turf where all the blades have the same radial orientation. Such artificial turf may therefore provide a higher grip upon treading and, in addition, a more natural appearance.

In a further aspect, the invention relates to a method for producing an artificial turf fiber, wherein the method comprises:
  preparing a liquid core polymer mixture, the core polymer mixture comprising at least the thread polymer and the core polymer, the thread polymer forming beads within the core polymer;
  coextruding the liquid core polymer mixture with a liquid cladding polymer component into a monofilament, the liquid core polymer mixture forming a cylindrical core, the liquid cladding polymer component comprising the cladding polymer and forming a cladding encompassing the core, the cladding having a non-circular profile;
  quenching the monofilament;
  reheating the quenched monofilament;
  stretching the reheated monofilament to deform the beads into threadlike regions; and
  providing one or more of the stretched monofilaments as an artificial turf fiber.

The method comprises the step of preparing a core polymer mixture. The core polymer mixture as used herein encompasses a mixture of different types of polymers and also possibly with various additives added to the core polymer mixture. The term 'polymer mixture' may also be replaced with the term 'master batch' or 'compound batch'. The core polymer mixture may be at least a three-phase system. A three-phase system as used herein encompasses a mixture that separates out into at least three distinct phases. The core polymer mixture comprises a thread polymer, a core polymer, and a compatibilizer. These three items form the phases of the three-phase system. If there are additional polymers or compatibilizers added to the system, then the three-phase system may be increased to a four-, five-, or more-phase system. The thread polymer and the core polymer are immiscible. The thread polymer forms polymer beads surrounded by the compatibilizer within the core polymer.

The method further comprises the step of coextruding the core polymer mixture with a cladding polymer component into a monofilament. To perform this extrusion the coextrusion components may for instance be heated. The method further comprises the step of quenching the monofilament. In this step the monofilament is cooled. The method further comprises the step of reheating the monofilament. The method further comprises the step of stretching the reheated filament to deform the polymer beads into threadlike regions and to form the monofilament into an artificial turf fiber. In this step the monofilament is stretched. This causes the monofilament to become longer and in the process the polymer beads are stretched and elongated. Depending upon the amount of stretching the polymer beads are elongated more. Stretching does not affect the cohesion between core and cladding as it does not introduce a differential speed between them.

The term 'polymer bead' or 'beads' may refer to a localized piece, such as a droplet, of a polymer that is immiscible in the core polymer. The polymer beads may in some instances be round or spherical or oval-shaped, but they may also be irregularly-shaped. In some instances the polymer beads will typically have a size of approximately 0.1 to 3 micrometer, preferably 1 to 2 micrometer in diameter. In other examples the polymer beads will be larger. They may for instance have a size with a diameter of a maximum of 50 micrometer.

The monofilaments formed by coextrusion of the core polymer mixture with the cladding polymer component may already feature a robust bond between core and cladding. However, the coextruded monofilament is not yet resilient because the thread polymer is only present as bead within the core polymer after quenching. The high elasticity offered by a rigid thread polymer may only be reached if the beads are extended into threadlike regions whose elasticity follows the same principle as that of a leaf spring. This extension may be achieved by reheating the monofilament and stretching it over a controlled length ratio. As a result, an artificial turf fiber is formed which may feature a high resilience due to a highly elastic core, optimized surface properties due to an appropriate choice of the cladding polymer, and inherent protection from splicing or delamination due to a highly stable contact layer where the core polymer is mixed with the cladding polymer.

Embodiments of the invention include forming the artificial turf fiber with particular geometry features of the non-circular profile. This may be done by pressing the bicomponent strand or precursor through an extrusion opening which has the non-circular profile, allowing the liquid cladding polymer component to fill the non-circular profile. According to embodiments, the coextruding further comprises forming the cladding with two protrusions which extend from the core in opposite directions.

According to embodiments, the profile of at least one of the protrusions comprises a concave side. According to embodiments, the profile of at least one of the protrusions comprises an undulated section spanning at least 60% of one side of said at least one protrusion. Possible advantages of the respective profile geometries are discussed further above.

According to embodiments, the extrusion opening is located downstream of a channel where the bicomponent polymer strand is allow to proceed in a laminar flow. This may improve the geometric stability of edges of the artificial turf fiber created by corners or narrow sections of the non-circular profile.

According to embodiments, the coextruding further comprises bringing the liquid core polymer mixture and the liquid cladding polymer component into contact with each other such that a contact layer is formed between the liquid core polymer mixture and the liquid cladding polymer component, the contact layer comprising a mixture of the liquid core polymer mixture and the liquid cladding polymer component. This may be achieved by controlling the flow characteristics (streaming pattern, velocity distribution, viscosities, shear moduli, temperature, melt flow indices, etc.) during the joining such that a stable, small-scale turbulence is created which causes the two components, which are supposed to be distributed separately in the upstream, to percolate in a thin region interfacing the core polymer mixture and the cladding polymer component. Possible beneficial effects of the method according to said embodiments, including a strengthened cohesion between core and cladding of the finished artificial turf fiber, are discussed throughout the present description.

According to embodiments, the coextruding is performed such that the liquid core polymer mixture and the liquid cladding polymer component enter the joining path with unequal flow rates. This may have the advantageous effect that the flow in the joining path is maintained at a stable, small-scale turbulence. This may support the formation of the contact layer with a constant thickness. Eventually, this may provide a bicomponent polymer fiber with increased shear stability.

According to embodiments, the contacting comprises pressing the liquid core polymer mixture and the liquid cladding polymer component concentrically along a joining path, the core polymer mixture and the cladding polymer component being allowed to mix along the joining path to form the contact layer, the contact layer being formed within an axial length of the joining path of 3 to 7 times the diameter of the liquid core polymer mixture at the upstream end of the joining path. According to embodiments, the diameter of the liquid core polymer mixture at the upstream end of the joining path is between 0.5 and 1.5 mm, preferably 1.25 mm.

The term "joining path", which may also be called a "common polymer path", is understood herein as a part, element, section, region, or the like, of a capillary or channel system of a coextrusion spinneret adapted for producing bicomponent fibers of the core-cladding (core-sheath, skin-core) type. The joining path comprises at least two inlet openings and one outlet opening and can be defined as a region of free channel space between these openings where two liquid polymer components, when fed through the at least two inlet openings, are allowed to come into contact with each other with no barrier in between. The joining path is typically located at the downstream end of the spinneret and may be immediately followed by the extrusion opening.

This may allow for adjusting the length of the joining path to the specific properties, such as viscosity, melt flow index or shear modulus, of the polymer components to be brought into contact and to the specific process parameters, like temperature or pressure, to provide beneficial rheological properties for establishing a firm bond between core and cladding of the bicomponent fiber. The flow in the joining path should be maintained at a stable, small-scale turbulence. If the length of the joining path is chosen too long, turbulence may get suppressed by feedback of increased wall-polymer interaction. On the other hand, a too short joining path may destroy stability of the turbulence such that the contact layer becomes variable e.g. in thickness and position. A bicomponent fiber produced with a too short joining region may show no beneficial surface properties anymore which are supposed to arise from a clear distinction between core and cladding.

According to embodiments, the method further comprises forming the core with a diameter of 50 to 600 micrometers, forming the cladding with a minimum thickness of 25 to 300 micrometers in all directions extending radially from the core, and forming each of the protrusions with a radial extension in a range of 2 to 10 times the radius of the core. As explained further above, the mentioned ranges for the core diameter and the minimum cladding thickness may be beneficial for providing the desired degree of stiffness and a sufficient amount of cladding material surrounding the core to form the mechanically robust contact layer. Said ratio of the radial extension of the protrusions with respect to the core radius may be chosen so as to improve the biomimetic properties of the artificial turf and the surface-to-mass ratio of the artificial turf fibers.

According to embodiments, the method is performed such that the contact layer assumes a radial thickness between 10 and 150 micrometers. According to embodiments, the method is performed such that the contact layer assumes a radial thickness between 10 and 50 percent of the minimum thickness of the cladding in all directions extending radially from the core. A contact layer within the given dimensions may be beneficial for providing a firm connection between core and cladding, while sparing sufficient volumes of core and cladding so that their respective desired functions, e.g. resilience of the core and softness of the cladding, are not adversely affected.

According to embodiments, the method is performed such that the threadlike regions assume a diameter of less than 50 µm and/or a length of less than 2 mm. As discussed further above, a proper dimensioning of the threadlike regions may allow for customizing the resilience of the artificial turf fiber to the expected usage conditions.

According to embodiments, the core polymer mixture is prepared free of at least one of the following components of the cladding: a wax, a dulling agent, a UV stabilizer, a flame retardant, an anti-oxidant, a fungicide, a pigment, and combinations thereof. It may be beneficial to use one or more of the mentioned additives only in the cladding where they are actually needed. This may allow for a more cost-effective production as less additives are consumer per unit length of the artificial turf fiber.

According to embodiments, the core polymer is high-density polyethylene (HDPE) and the cladding polymer being linear low-density polyethylene (LLDPE). In liquefied form, this combination may feature a high miscibility with each other as well as rheological properties which are optimized for forming a firm bond between core and cladding by means of coextrusion. When formed into a monofilament for producing an artificial turf fiber according to embodiments of the invention, the two solidified polymers may provide further advantages: HDPE is denser and more rigid than LLDPE, which may thus add to the resilience of the artificial turf fiber, while LLDPE is soft and wear resistant, which may provide a reduced risk of injury and amended durability.

According to embodiments, the liquid core polymer mixture is at least a three-phase system, the core polymer mixture further comprises a compatibilizer, and the preparing of the liquid core polymer mixture results in the beads being surrounded by the compatibilizer and immersed in the core polymer. As explained in more detail further above, a compatibilizer may be advantageously used to stabilize the emulsion of the thread polymer beads in the core polymer in fluid state during production.

It is understood that a person skilled in the art knows alternative approaches for preparing the core polymer mixture such that it comprises beads surrounded by a compatibilizer and immersed in the core polymer. In a non-exhaustive example, the compatibilizer is applied to a granulate of the thread polymer using a coating technique, and subsequently the coated granules are added to the molten core polymer.

According to embodiments, the thread polymer is immiscible with the cladding polymer, the coextruding further comprising bringing the liquid core polymer mixture and the liquid cladding polymer component into contact with each other such that a contact layer is formed between the liquid core polymer mixture and the liquid cladding polymer component, the contact layer comprising a mixture of the core polymer and the cladding polymer, the contact layer locally further comprising the compatibilizer as a third component of the mixture. This may have the beneficial effect that the bonding force between core and cladding is not diminished locally as an effect of lacking miscibility of cladding polymer and thread polymer.

According to embodiments:
  the core polymer mixture comprises the thread polymer and the additional thread polymer combined in an amount of 1 to 30 percent by weight of the core polymer mixture; and/or
  the core polymer mixture comprises the compatibilizer in an amount of 0 to 60 percent by weight of the core polymer mixture; and/or
  the monofilament comprises the cladding polymer in an amount of 50-80 percent by weight of the monofilament.

The mentioned percentage ranges may allow for choosing an optimal material combination where, for instance, the requirements for fiber resilience, surface smoothness, and economic surface-to-mass ratio are balanced.

According to embodiments, the preparation of the liquid core polymer mixture comprises:
  forming a base polymer mixture by mixing the thread polymer with the compatibilizer;
  heating the base polymer mixture;
  extruding the base polymer mixture;
  granulating the extruded base polymer mixture;
  mixing the granulated base polymer mixture with the core polymer; and
  heating the granulated base polymer mixture with the core polymer to form the liquid core polymer mixture.

This particular method of preparing the polymer mixture is presented here as a first alternative and may be advantageous because it enables very precise control over how the thread polymer and compatibilizer are distributed within the core polymer. For instance, the size or shape of the extruded base polymer mixture may determine the size of the polymer beads in the core polymer mixture.

In the aforementioned method of preparing the core polymer mixture, for instance, a so called one-screw extrusion method may be used. As an alternative to this, the polymer mixture may also be created by putting all of the components that make it up together at once. For instance, the thread polymer, the core polymer and the compatibilizer could be all added together at the same time. Other ingredients such as additional polymers or other additives could also be put together at the same time. The amount of mixing of the core polymer mixture could then be increased, for instance, by using a two-screw feed for the extrusion. In this case, the desired distribution of the polymer beads can be achieved by using a proper rate or amount of mixing.

It is understood that the step of heating the granulated base polymer mixture with the core polymer concludes the preparation of the core polymer mixture, which in turn is the first step of the method for producing an artificial turf fiber according to embodiments of the method disclosed herein. Hence, it is clear that the step of coextruding the core polymer mixture requires that the core polymer mixture is prepared beforehand, and that the core polymer mixture must be melted (see definition further below) in order to be able to perform the coextrusion.

In a second alternative, it is possible to prepare the liquid core polymer mixture by mixing solid granulates of the core polymer, the thread polymer and the compatibilizer, and subsequently melting them. This may likewise yield the core polymer mixture with beads of the thread polymer being surrounded by the compatibilizer and immersed in the core polymer by statistical self-alignment of the liquid compatibilizer into the energetically favorable state of interfacing droplets of the liquid thread polymer and the surrounding matrix of the liquid core polymer.

In both alternatives, the step of heating results in melting the core polymer mixture, so that a subsequent coextrusion with the cladding polymer component is possible. In other words, the core polymer mixture, which can generally be regarded as being composed of a mixture of multiple phases, is defined as melted if the combined volume of all liquid phases (at a given temperature) is larger than the combined volume of its solid phases. Thus, the melted core polymer mixture can be either liquid in all of its phases, or it may contain a minor portion of dispersed solid phases with a melting point above the process temperature which are extruded together with the major portion of liquid phases.

According to embodiments, the coextrusion is performed at working temperatures between 180 and 270° C. This may be a temperature range with beneficial rheologic properties for many polymers, such as polyethylene and/or polyamide, which are typically used for the production of artificial turf fibers. Said temperature range may be particularly beneficial for creating a stable, small-scale turbulence in a joining path where the core polymer mixture and the cladding polymer component are brought into contact with each other, thus causing the core polymer mixture and the cladding polymer component to mix in a thin contact layer interfacing core and cladding. Said temperature range may also be beneficial for allowing the melted cladding polymer component to fill the whole non-circular profile of the coextruded artificial turf fiber, including narrow regions and/or boundary areas with a high flow resistance, completely and uniformly without edge instabilities caused by undesirable turbulence.

The feed rate of the core polymer mixture and the cladding polymer component may be controlled independently from each other. Depending on the viscosities and/or melt flow indexes of the two liquid polymers brought into contact, the flow characteristics of the two polymers may be controlled precisely by adjusting the flow velocity difference of the two polymers in the joining path. The flow may get turbulent if the velocity difference exceeds a threshold which is characteristic for the particular viscosities and/or melt flow indexes of the two interacting fluids. Feeding the core polymer mixture at a greater feed rate than the cladding polymer component may thus have the effect that the flow is maintained at a stable, small-scale turbulence. This may result in the formation of a thin contact layer of constant thickness between core and cladding where the core polymer and the cladding polymer are intermixed. Eventually, the method may yield an artificial turf fiber with increased shear stability.

According to embodiments, the core polymer mixture is at least a three-phase system, the thread polymer forming first ones of the beads within the core polymer, the core polymer mixture further comprising an additional thread polymer, the additional thread polymer being different from the thread polymer and being any one of the following: polyamide, polyethylene terephthalate, polybutylene terephthalate, polyester, and polybutyrate adipate terephthalate, and the additional thread polymer forming second ones of the beads within the core polymer, the stretching deforming the first ones of the beads into first ones of the threadlike regions and deforming the second ones of the beads into second ones of the threadlike regions. Manufacturing the threadlike regions from two different polymers may provide a precise means for controlling the size and distribution of the threadlike regions.

As an alternative, the thread polymer could be used to make a granulate with the compatibilizer separately from making the additional thread polymer with the same or a different compatibilizer. The granulates could then be mixed with the core polymer to make the core polymer mixture. As another alternative to this, the core polymer mixture could be made by adding the thread polymer, the core polymer, the additional thread polymer and the compatibilizer all together at the same time and then mixing them more vigorously. For instance, an extruder could be used with a two-screw feed.

According to embodiments, the providing comprises forming the stretched monofilament into a yarn and/or weaving, spinning, twisting, rewinding, and/or bundling the stretched monofilament into the artificial turf fiber. This may allow for producing an artificial turf where each of the artificial turf fibers is a monofilament or, alternatively, formed by a plurality of the monofilaments according to embodiments of the invention. Producing artificial turf fibers from more than one monofilament may beneficially provide a high-durability artificial turf with a coarser and stiffer pile.

In yet another aspect, the invention relates to a method for producing an artificial turf, the method comprising:
  generating an artificial turf fiber by performing the method for producing an artificial turf fiber described herein,
  incorporating the sections into an artificial turf backing, and
  cutting the artificial turf fiber into sections, creating cut surfaces which expose a contact layer between the core and the cladding.

The method comprises the step of incorporating the artificial turf fiber into an artificial turf backing. In some examples the artificial turf backing is a textile or a textile matt. The incorporation of the artificial turf fiber into the artificial turf backing could for example be performed by tufting the artificial turf fiber into an artificial turf backing and binding the tufted artificial turf fibers to the artificial turf backing. For instance, the artificial turf fiber may be inserted with a needle into the backing and tufted the way a carpet may be. If loops of the artificial turf fiber are formed then may be cut during the same step.

The incorporation may comprise the step of binding the artificial turf fibers to the artificial turf backing. In this step the artificial turf fiber is bound or attached to the artificial turf backing. This may be performed in a variety of ways such as gluing or coating the surface of the artificial turf backing to hold the artificial turf fiber in position. This, for instance, may be done by coating a surface or a portion of the artificial turf backing with a material such as latex or polyurethane.

The incorporation of the artificial turf fiber into the artificial turf backing could for example be performed alternatively by weaving the artificial turf fiber into artificial turf backing (or fiber mat) during manufacture of the artificial turf carpet. This technique of manufacturing artificial turf is known from United States patent application US 2012/0125474 A1.

The method comprises the step of cutting the artificial turf fiber into sections. Each cut has a cross-section to the artificial turf fiber surface which is exposed to external influences such as wear, UV radiation, or reactive substances which may be dissolved, e.g. in rainwater. The usage of artificial turf fibers according to embodiments of the invention for producing the artificial turf may result in an increased resistance against such detrimental external influences. This in turn may yield an artificial turf with improved protection against delamination or splicing of the bicomponent artificial turf fibers. Another beneficial effect may be improved protection against loss of resilience, as the threadlike regions exhibit only a small portion of the cut surface as a working surface for detrimental influences.

It is understood that one or more of the aforementioned embodiments of the invention may be combined as long as the combined embodiments are not mutually exclusive.

SHORT DESCRIPTION OF THE FIGURES

Figure 2:
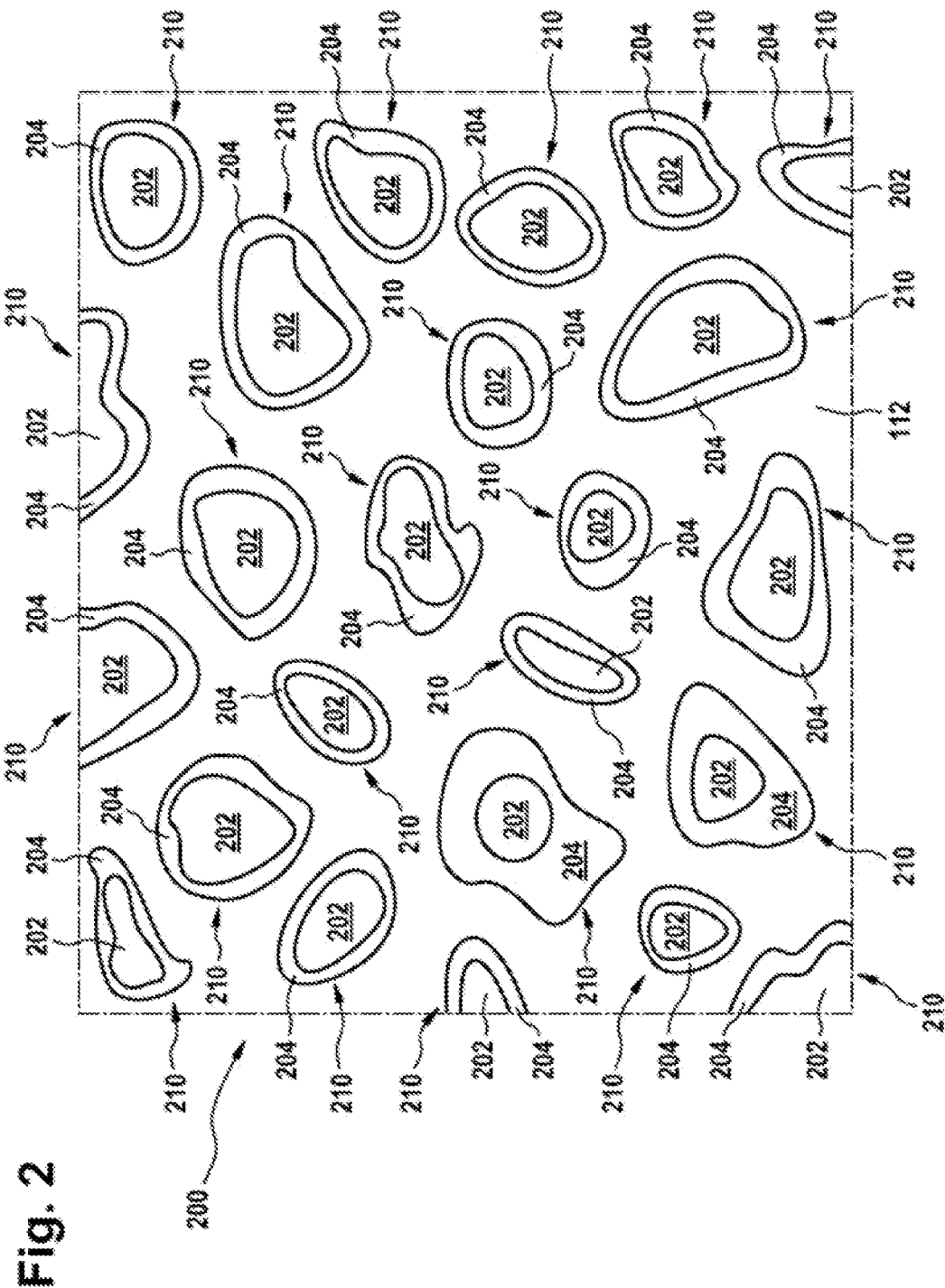
Figure 3:
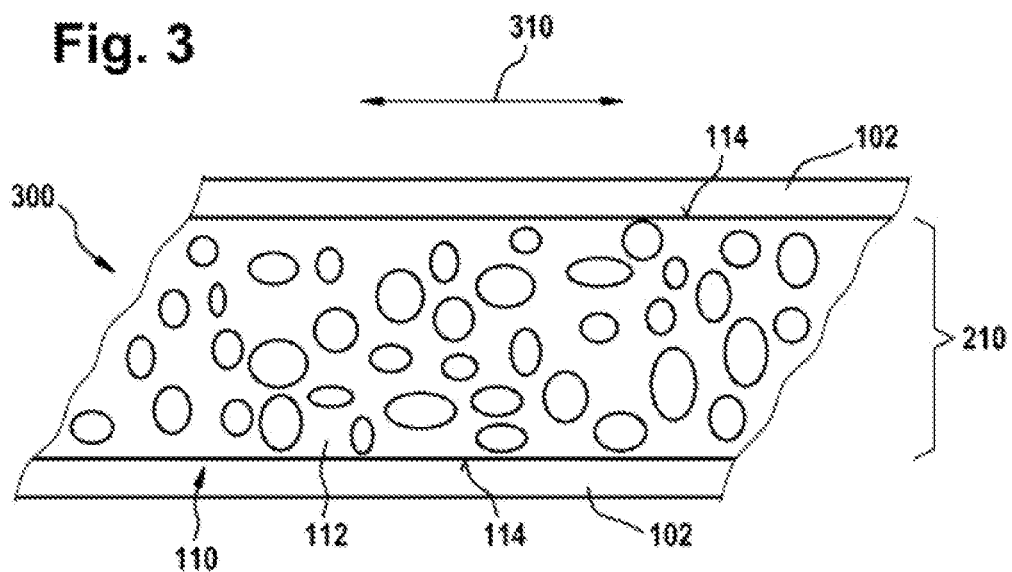
Figure 4:
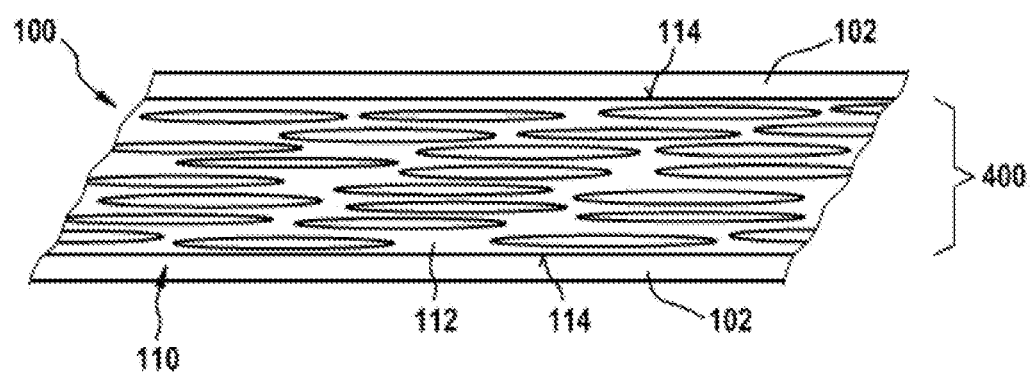
Figure 5:
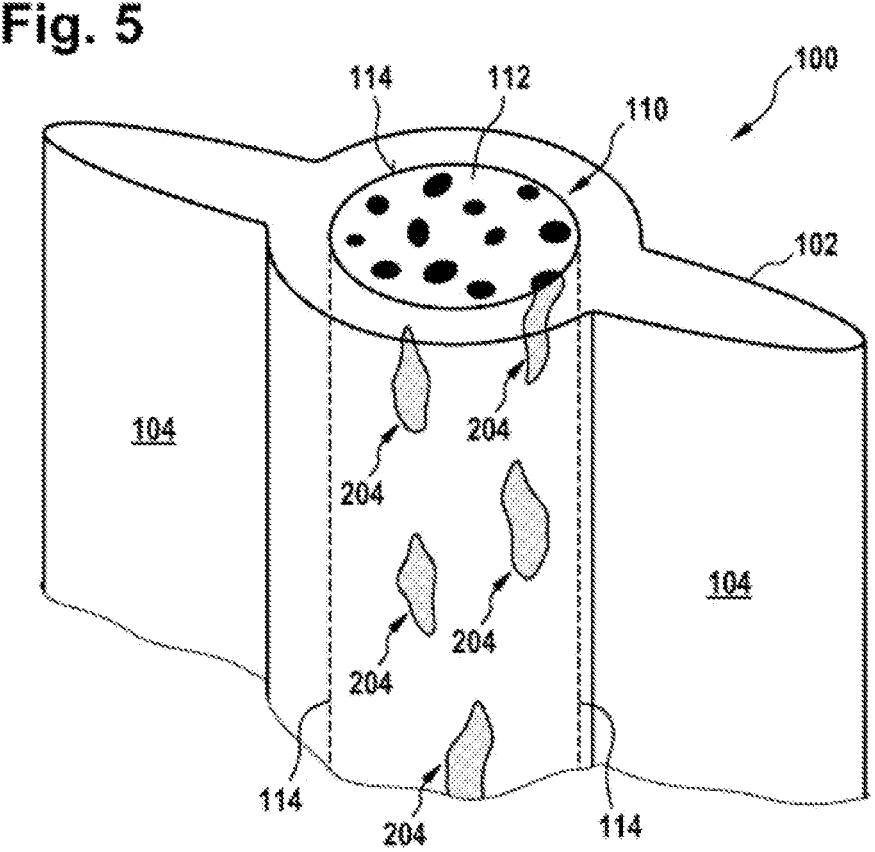
Figure 6:
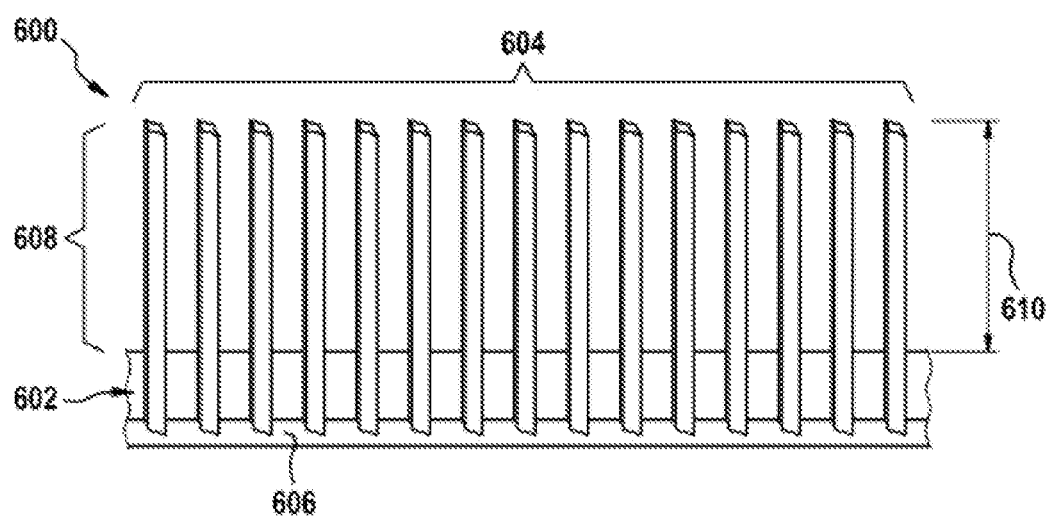
Figure 7:
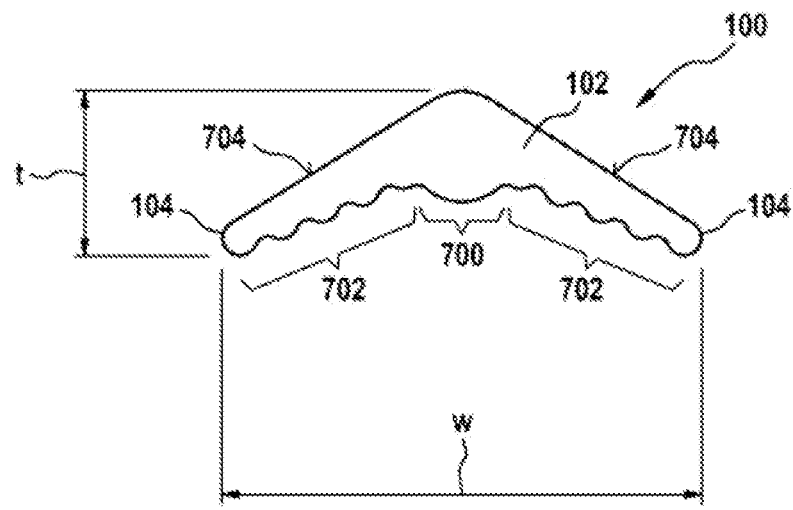
Figure 8:
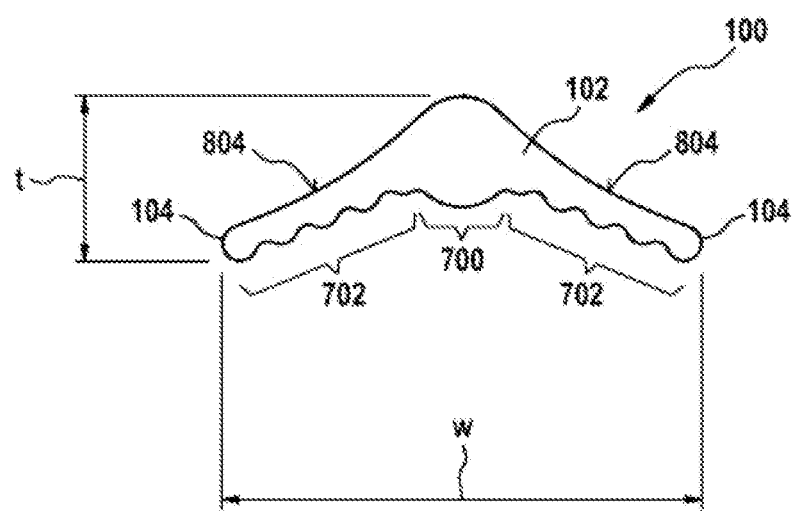
Figure 9:
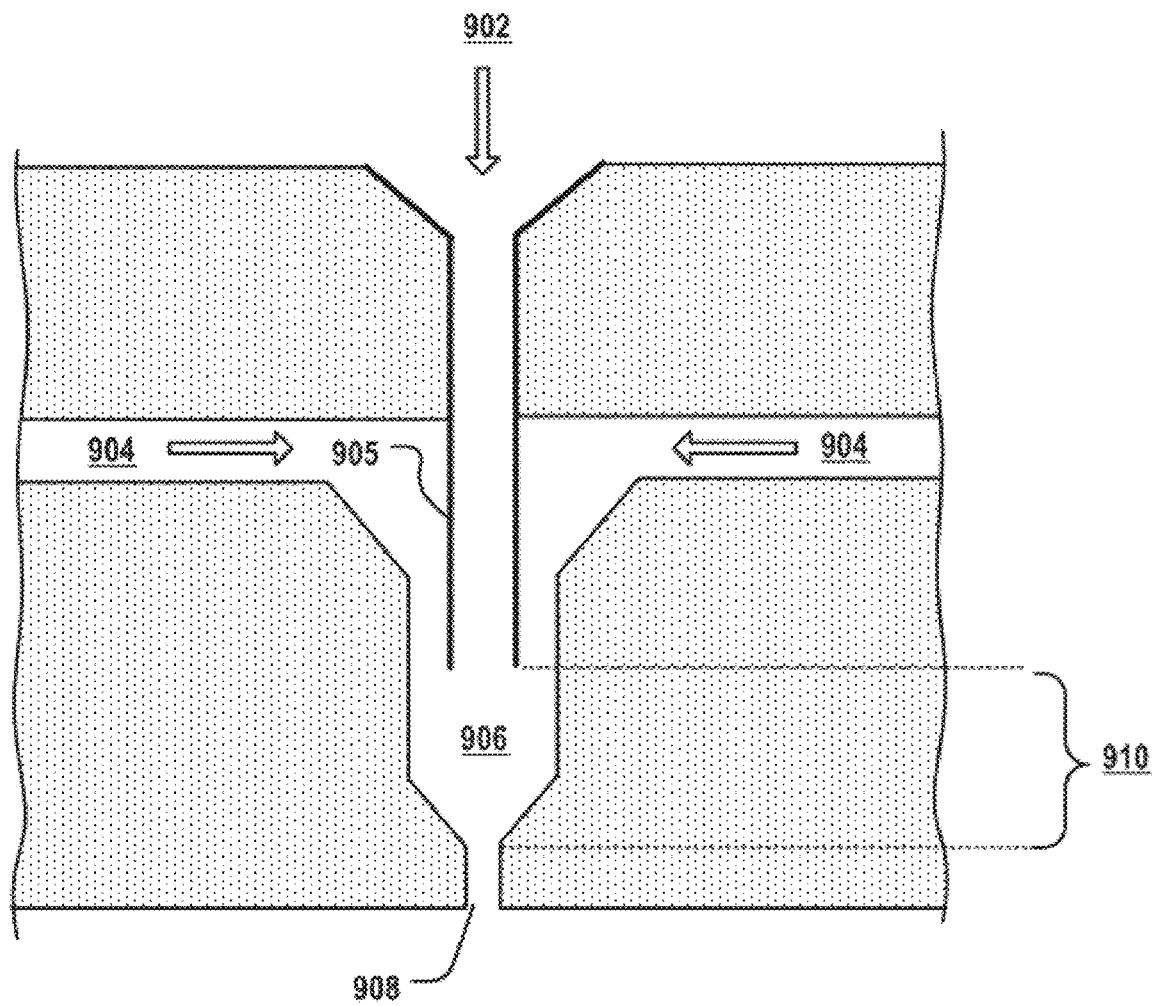

In the following, embodiments of the invention are explained in greater detail, by way of example only, making reference to the drawings in which:
  FIG. 1 shows a radial cross-section of a monofilament for producing an artificial turf fiber;
  FIG. 2 visualizes the composition of a three-component core polymer mixture;
  FIG. 3 shows a schematic axial cross-section of a monofilament before stretching;
  FIG. 4 shows a schematic axial cross-section of a monofilament after stretching;
  FIG. 5 shows a monofilament, the cladding being transparent such that the contact layer between core and cladding becomes visible FIG. 6 is a cross-sectional diagram of an artificial turf comprising artificial turf fibers made from monofilaments;

FIG. 7 is a cross-sectional profile of an artificial turf fiber with protrusions comprising an undulated and a straight section FIG. 8 is a cross-sectional profile of an artificial turf fiber with protrusions comprising an undulated and a concave section; and FIG. 9 is a cross-sectional detail of a coextrusion device with a joining path.

DETAILED DESCRIPTION

Like numbered elements in these figures are either equivalent elements or perform the same function. Elements which have been discussed previously will not necessarily be discussed in later figures if the function is equivalent.

Bicomponent artificial turf fibers have each of their components designed to fulfill the opposing requirements of providing artificial grass blades which are soft but resilient at the same time. While the resilience of an artificial turf fiber can be provided by selecting a rigid material for the core strand, its cladding can provide a soft surface which is better fit to reduce the risk of injuries and imitate the haptic and visual behavior of natural grass. However, no material combination of core and cladding polymers is known to date which meets these demands, but is also miscible in a liquid state during manufacturing such that the two materials can be laminated together. For this reason, the core and cladding of bicomponent artificial turf fibers are typically joined together by an interfacing layer of a third polymer which is cohesive to the two otherwise immiscible components. However, cohesive forces between the adjacent layers are not strong enough to provide sufficient protection against splicing of the three layers. Against this background, the invention seeks to provide a bicomponent artificial turf fiber which is less prone to delamination and provide a more cost-effective surface-to-mass ratio as well as a closer resemblance of natural lawn.

FIG. 1 shows a schematic diagram of a cut through a monofilament 100 according to embodiments of the invention, the cut being oriented perpendicularly with respect to the central axis of the monofilament 100. It comprises a cylindrical core 110 and a non-circular cladding 102 surrounding the core 110. The core 110 comprises a core polymer 112 and threadlike regions which are embedded in the core polymer 112. The threadlike regions are formed from a thread polymer 202 which is preferably a polymer with a high bending rigidity or stiffness such as polyamide. The threadlike regions permeate the core polymer 112 in axial directions and at random radial positions and/or orientations.

The core polymer 112 makes up the majority of the core volume and may be any polymer which is miscible with the cladding polymer forming the cladding 102. As the core polymer 112 makes up the largest portion of the core 110, it is preferably chosen to be a comparably inexpensive material such as polyethylene. The core polymer 112 may be immiscible with the thread polymer 202. In this case, the threadlike regions are surrounded by a compatibilizer 204, which is another polymer material with the capability to emulsify the thread polymer 202 with the liquid core polymer 112. After manufacturing, the threadlike regions remain cohesively coupled to the core polymer 112 in the solidified monofilament 100.

The core 110 may comprise 1 to 30 percent by its weight the thread polymer 202 and, if any, an additional thread polymer combined. Particularly, the thread polymer 202 and, if any, the additional thread polymer combined may be 1 to 20 percent by weight of the core 110. More particularly, the core 110 may comprise 5 to 10 percent by its weight the thread polymer 202 and, if any, the additional thread polymer combined. The core 110 may for instance have a diameter of 50 to 600 micrometer in size. It may typically reach a yarn weight of 50 to 3000 dtex.

The threadlike regions may have a diameter of less than 50 micrometers. Particularly, the threadlike regions may have a diameter of less than 10 micrometers. More particularly, the threadlike regions may have a diameter between 1 and 3 micrometers.

The cladding 102 is formed by a cladding polymer which is chosen to be miscible with the core polymer 112 in fluid state. The cladding polymer may be identical to the core polymer 112. The annular cylindrical zone or area where the cladding polymer contacts the core polymer 112 is a contact layer 114 where both polymers are mixed with each other. Hence, the contact layer 114 may bond core 110 and cladding 102 together with stronger forces than the long-range forces which occur typically within arrangements with a purely cohesive bonding.

The cladding 102 completely surrounds the core 110 with two circular sections on two opposite sides of the core 110 and two flat, thin, long protrusions 104 on two other opposing sides of the core 110. The cladding 102 is preferably formed by a polymer such as polyethylene which may provide a soft and smooth surface characteristic. The cladding 102 may comprise additives which support its interfacing function to the environment and/or a user. Typical additives to the cladding 102 may be, for example, pigments providing a specific color, a dulling agent, a UV stabilizer, flame retardant materials such as aramid fibers or intumescent additives, an anti-oxidant, a fungicide, and/or waxes increasing the softness of the cladding 102.

Providing the cladding 102 with additives may have the advantage that these can be left out from the core 110. This way, a smaller content of expensive additive material per mass unit is required. As an example, it is not necessary to add pigments to the core 110 because only the cladding 102 is visible from the outside. By way of a more specific example, it may be beneficial to add a green pigment, a dying agent and a wax to the cladding 102 to gain a closer resemblance of natural grass blades.

The non-circular profile of the cladding 102 may be symmetric or irregular; polygonal, elliptic, lenticular, flat, pointed or elongated. Preferably, the cladding 102 resembles a blade of grass by encompassing the circular-cylindrical core 110 with two convex segments extending in two opposite directions from the geometric center of the monofilament and two flat protrusions 104 extending in two further opposite directions from the geometric center of the monofilament, the convex segments and the flat protrusions 104 being alternatingly joined by concave segments. The two flat protrusions 104 may also add to the biomimetic properties of the monofilament 100 and may increase the surface-to-mass ratio for each monofilament 100 and, accordingly, may provide an improved surface coverage for an artificial turf manufactured from artificial turf fibers on the basis of such monofilaments 100.

A monofilament 100 as shown in FIG. 1, which can also be referred to as a filament, can be produced by feeding a core polymer mixture 200 and a cladding polymer component into a fiber producing coextrusion line. The two polymer melt components are prepared separate from each other and then joined together in the coextrusion tool, i.e., a spinneret plate, forming the two melt flows into a filament which is quenched or cooled in a water spin bath, dried and stretched by passing rotating heated godets with different rotational speed and/or a heating oven.

The thread polymer 202 is prepared by first mixing it with the compatibilizer 204. This may result in granular material which consists of a two-phase system in which the thread polymer 202 is surrounded by the compatibilizer 204.

Then, a three-phase system is formed by adding the core polymer 112 to the mixture whereby in this example the quantity of the core polymer 112 is about 80-90 mass percent of the three-phase system, the quantities of the thread polymer 202 being 5% to 10% by mass and of the compatibilizer 204 being 5% to 10% by mass. Using extrusion technology results in a mixture of droplets or of beads 210 of the thread polymer 202 surrounded by the compatibilizer 204 that is dispersed in the polymer matrix of the core polymer 112. In a practical implementation a so called master batch including granulate of the thread polymer 202 and the compatibilizer 204 is formed. The master batch may also be referred to as a "polymer mixture" herein. The granulate mix is melted and a mixture of the thread polymer 202 and the compatibilizer 204 is formed by extrusion. The resulting strands are crushed into granulate. The resultant granulate and granulate of the core polymer 112 are then used as the core polymer mixture 200 in the coextrusion process described below.

FIG. 2 shows a diagram which illustrates a cross-section of a core polymer mixture 200. The polymer mixture comprises a thread polymer 202, a core polymer 112 and a compatibilizer 204. The thread polymer 202 and the core polymer 112 are immiscible. The thread polymer 202 is less abundant than the core polymer 112. The thread polymer 202 is shown as being surrounded by compatibilizer 204 and being dispersed within the core polymer 112. The thread polymer 202 surrounded by the compatibilizer 204 forms a number of polymer beads 210. The polymer beads 210 may be spherical or oval in shape or they may also be irregularly-shaped depending on how well the polymer mixture is mixed and the temperature.

The core polymer mixture 200 shown in FIG. 2 is an example of a three-phase system. The core polymer mixture 200 is free of color pigments, UV and thermal stabilizers, process aids and other additive substances that are known as such from the art. However, the core polymer 112 may contain more than three phases, such as e.g. a four-phase system comprising the thread polymer 202, the core polymer 112, an additional thread polymer, and the compatibilizer 204. In such a four-phase system, the thread polymer 202 and the additional thread polymer may be not miscible with the core polymer 112. The compatibilizer 204 then separates the thread polymer 202 from the core polymer 112 and the additional thread polymer from the core polymer 112. In this example the same compatibilizer 204 is used for both the thread polymer 202 and the additional thread polymer. In other examples, the compatibilizer 204 used for the thread polymer 202 may be different from the compatibilizer 204 used for the additional thread polymer. In a four-phase core polymer mixture 200, the polymer beads 210 may be formed by both the thread polymer 202 and additional thread polymer.

The compatibilizer 204 may be any one of the following: a maleic acid grafted on polyethylene or polyamide; a maleic anhydride grafted on free radical initiated graft copolymer of polyethylene, SEBS, EVA, EPD, or polypropylene with an unsaturated acid or its anhydride such as maleic acid, glycidyl methacrylate, ricinoloxazoline maleinate; a graft copolymer of SEBS with glycidyl methacrylate, a graft copolymer of EVA with mercaptoacetic acid and maleic anhydride; a graft copolymer of EPDM with maleic anhydride; a graft copolymer of polypropylene with maleic anhydride; a polyolefin-graft-polyamidepolyethylene or polyamide; and a polyacrylic acid type compatibilizer. As a consequence of its interfacing topology, the compatibilizer 204 may be a major portion (up to 60% by weight) of the core polymer mixture 200 in order to enable a full encasement of the threadlike regions 400 after stretching.

Notwithstanding the above, it is emphasized that the liquid core polymer mixture 200, and equivalently, the core 110 formed from the liquid core polymer mixture 200 during manufacturing, is at least a two-phase system comprising the thread polymer 202 as a first one of the at least two phases, and the liquid core polymer 112 as a second one of the at least two phases. This includes the example that the liquid core polymer mixture, or respectively, the core, is a two-phase system, i.e., the core is free of the compatibilizer.

The thread polymer 202 and the core polymer 112 are two chemically different polymers. In any case, each of the core polymer 112 and the thread polymer form a phase, i.e. a macroscopic, continuous volume filled with a plurality of molecules of the respective polymer. Consequentially, any beads 210 or threadlike regions 400 formed from the thread polymer 202 are macroscopic phases embedded in the macroscopic core polymer phase 112. More precisely, any one of the threadlike regions 400 is not to be understood as a single stretched polymer molecule.

The cladding polymer component is prepared by mixing the pure cladding polymer granulate with additives as desired for the resulting artificial turf fibers. Suitable additives may be one or more of a wax, a dulling agent, a UV stabilizer, a flame retardant, including aramid fibers and/or an intumescent additive, an anti-oxidant, a fungicide, an antimicrobial agent, such as a silver salt, and/or a pigment, including an infrared-(IR-) reflective pigment or combinations thereof.

The core polymer mixture 200 and the cladding polymer component are then melted in two single-component extrusion units and fed to a coextrusion head or die, a spinneret, or a similar coextrusion device. The melt temperature used during extrusion is dependent on the types of polymer and compatibilizer 204 that are used.

The melt temperature is typically between 230° C. and 280° C. A preferable choice of process parameters for the combination of polyamide being the thread polymer and polyethylene being both the core polymer and the cladding polymer, is a pressure of 80 bar and a temperature of 240° C.

The coextrusion includes joining the cladding polymer component to the core polymer mixture 200 such that they form a polymer strand of two components which are connected by a contact layer 114 comprising a mixture of the core polymer 112 and the cladding polymer. The joining process makes use of a controllable small-scale turbulence to avoid purely laminar surface-to-surface joining. The control of this turbulence involves process parameters such as temperature and/or feed rates to influence the rheological behavior (including e.g. viscosity, melt flow index, flow velocity profile) of the two components to be joined. The strand can be extruded through an extrusion opening to form a bicomponent polymer monofilament 300 of a desired contour. Preferably, the monofilament 300 is quenched after extrusion to fix its structure thus formed.

FIG. 3 shows a cross-section of a small segment of a quenched monofilament 300 before stretching. The monofilament 300 is again shown as comprising the core polymer 112 with the polymer beads 210 mixed in and the cladding polymer surrounding the core polymer 112. The polymer beads 210 are separated from the core polymer 112 by compatibilizer 204 which is not shown. To form the threadlike regions, a section of the monofilament 300 is heated and then stretched along an axial direction of the monofilament 300. This is illustrated by the arrows which show the direction of stretching 310.

FIG. 4 illustrates the effect of stretching the monofilament 300 with an example of a cross-section of a stretched monofilament 100. The polymer beads 210 in FIG. 3 have been stretched into threadlike regions. The amount of deformation of the polymer beads 210 would be dependent upon how much the monofilament 300 has been stretched.

The polymer beads 210 may comprise crystalline portions and amorphous portions. Stretching the polymer beads 210 into threadlike regions may cause an increase in the size of the crystalline portions relative to the amorphous portions.

Core 110 and cladding 102 are joined together by a contact layer 114 where the core polymer 112 and the cladding polymer are mixed. As can be seen in FIG. 5, the threadlike regions comprised by the core 110 may locally extend into the contact layer 114 as a consequence of turbulent mixing during joining and of stretching. Preferably, the thread polymer 202 amounts to not more than 30% by weight of the core, such that the cohesion provided by the contact layer 114 remains equal or stronger than in conventional three-component artificial turf fibers with a compatibilizing layer interfacing core and cladding, even if thread polymer 202 and cladding polymer are not miscible with each other. The contact layer 114 may extend radially up to 50 percent of the minimum thickness of the cladding 102 in all directions extending radially from the core 110.

FIG. 6 shows a schematic cross-section of an exemplary piece of artificial turf 600. The artificial turf 600 comprises an artificial turf backing or carpet 602. Artificial turf fiber 604 has been tufted into the artificial turf backing 602 to form a pile 608. On the bottom of the artificial turf backing 602 a coating 606 is shown. The coating may serve to bind or secure the artificial turf fiber 604 to the artificial turf backing 602. The coating 606 may be optional. For example, the artificial turf fibers 604 may be alternatively woven into the artificial turf backing 602. Various types of glues, coatings or adhesives could be used for the coating 606. The artificial turf fibers 604 are shown as forming the pile 608 by extending a distance 610 above the artificial turf backing 602. The distance 610 is essentially the height of the pile 608 of the artificial turf fibers 604. The length of the threadlike regions within the artificial turf fibers 604 is preferably half of the distance 610 or less.

Providing the artificial turf fiber 604 may comprise weaving, spinning, twisting, rewinding, and/or bundling one or more of the stretched monofilament 100 into the artificial turf fiber 604. The incorporating may comprise weaving or tufting the artificial turf fiber 604 into the artificial turf backing 602.

An effect of designing the protrusions with a slight concave curvature can be demonstrated by comparison of FIGS. 7 and 8. FIG. 7 shows a normal cross-sectional profile of an undulated artificial turf fiber comprising a round bulge 700 at the center and two protrusions with rounded tips. The profile extends over an overall thickness t between the front central bulge 700 and the rear tip of the protrusions. The distance between the two tips is the overall width w of the fiber. Both protrusions have a profile with one straight side 704 and, opposite to the straight side 704, one undulated side 702 with four notches along a straight base line. Taking into account the axial extension of the fiber, this profile corresponds to protrusions with one flat face and one grooved face.

The protrusions may include an angle between 100 and 180 degrees. In the non-limiting example shown, the protrusions enclose an angle of about 135 degrees towards the undulated side 702 of the profile. Both protrusions have a radial extension of about three times the thickness of the bulge 700. For the purpose of demonstration only, assuming an exemplary overall profile width w=1.35 mm and overall thickness t=0.45 mm, the profile of FIG. 7 would have a cross-sectional area of 0.216 mm$^2$. At an exemplary average density of 0.92 g/mm$^2$, this corresponds to a yarn weight of about 2000 dtex.

FIG. 8 shows a normal cross-sectional profile of an undulated artificial turf fiber similar to the one shown in FIG. 7, the difference being that the straight sides 704 of the profile are replaced by concave sides 804, corresponding to protrusions with one concave face and one grooved face. The curvature has been designed such that the thickness of the protrusions (measured between the concave side 804 and the base line of the undulated side 702) is gradually declining towards their respective tip. For comparison with the non-limiting example above, with an overall width w=1.35 mm and overall thickness t=0.45 mm as above, the profile of FIG. 8 would have a cross-sectional area of 0.180 mm$^2$. At the assumed average density of 0.92 g/mm$^2$, this corresponds to a yarn weight of about 1650 dtex. A fiber with the concave profile of FIG. 8 would thus have a weight reduction of about 17% compared to a fiber with the straight profile of FIG. 7. As the concave profile has a slightly larger perimeter than the straight profile, a fiber with the concave profile would also have an increased surface-to-mass ratio compared to a fiber with the straight profile.

FIG. 9 illustrates coextrusion of two polymer components in a coextrusion device with a joining path 910 located upstream of a coextrusion opening 908. The setup comprises a hole 906 which receives a free end of a capillary tube 905. Opposite to the inserted capillary tube 905, hole 906 ends in coextrusion opening 908. A clearance between capillary tube 905 and the walls of hole 906 hydraulically connects the hole to a second channel system 904. Capillary tube 905 is hydraulically connected to a first channel system 902 and is not fully inserted into hole 906, such that a section 910 of hole 906 is hydraulically connected both to first channel system 902 and to second channel system 904. This section 910 is the joining path 910 of the depicted coextrusion setup. Joining path 910 extends from capillary tube 905 to extrusion opening 908, as is indicated by dotted lines.

During coextrusion operation, capillary tube 905 receives a molten core polymer component from first channel system 902 and hole 906 receives a molten cladding polymer component from second channel system 904. The respective transport directions of the polymer components are indicated by arrows. The two polymer components flow separated from each other until they come into contact in joining path 910. The two joined polymer components pass joining path 910, which narrows to the cross section of coextrusion opening 908, and exit coextrusion opening 908 as a bicomponent monofilament.

In cases where core and cladding are to be joined together with a contact layer comprising a mixture of the core polymer mixture and the cladding polymer component, the dimensions of the joining path are suitably chosen such that a stable contact layer of homogeneous thickness is formed. In an example, the contact layer is formed within an axial length of the joining path of 3 to 7 times the diameter of the liquid core polymer mixture at the upstream end of the joining path. In a more specific example, the diameter of the liquid core polymer mixture at the upstream end of the joining path is between 0.5 and 1.5 mm, the axial length of the joining path is between 1.5 and 10.5 mm, causing the melted core polymer mixture to mix with the cladding polymer component in a contact layer with a radial thickness between 10 and 150 μm.

LIST OF REFERENCE NUMERALS 100 stretched monofilament
102 cladding
104 protrusion
110 core
112 core polymer
114 contact layer
200 core polymer mixture
202 thread polymer
204 compatibilizer
210 polymer beads
300 raw monofilament
310 direction of stretching
400 threadlike regions
600 artificial turf
602 artificial turf backing
604 artificial turf fiber
606 coating
608 pile
610 height of pile
700 central bulge
702 undulated side
704 straight side
804 concave side
902 first channel system
904 second channel system
905 capillary tube
906 hole
908 coextrusion opening
910 joining path section

The invention claimed is:

1. A method for producing an artificial turf fiber, the method comprising:
preparing a liquid core polymer mixture, the core polymer mixture comprising a core polymer and a thread polymer forming beads within the core polymer;
coextruding the liquid core polymer mixture with a liquid cladding polymer component into a monofilament, the liquid core polymer mixture forming a cylindrical core, the liquid cladding polymer component forming a cladding encompassing the core, and the cladding having a non-circular; profile,
wherein the liquid core polymer mixture and the liquid cladding polymer component are miscible, and
wherein the coextruding further comprises bringing the liquid core polymer mixture and the liquid cladding polymer component into contact with each other such that a contact layer is formed between the liquid core polymer mixture and the liquid cladding polymer component, the contact layer comprising a mixture of the liquid core polymer mixture and the liquid cladding polymer component;
quenching the monofilament;
reheating the quenched monofilament;
stretching the reheated monofilament to deform the beads; and
providing one or more of the stretched monofilaments as the artificial turf fiber.

2. The method of claim 1, the coextruding further comprising forming the cladding with two protrusions which extend from the core in opposite directions.

3. The method of claim 2, the profile of at least one of the protrusions comprising a concave side.

4. The method of claim 2, the profile of at least one of the protrusions comprising an undulated section spanning at least 60% of one side of said at least one protrusion.

5. The method of claim 1, the contacting comprising pressing the liquid core polymer mixture and the liquid cladding polymer component concentrically along a joining path, the liquid core polymer mixture and the liquid cladding polymer component being allowed to mix along the joining path to form the contact layer, the contact layer being formed within an axial length of the joining path of 3 to 7 times a diameter of the liquid core polymer mixture at an upstream end of the joining path.

6. The method of claim 5, the coextruding being performed such that the liquid core polymer mixture and the liquid cladding polymer component enter the joining path with unequal flow rates.

7. The method of claim 5, the diameter of the liquid core polymer mixture at the upstream end of the joining path being between 0.5 and 1.5 mm.

8. The method of claim 1, the thread polymer being any one of polyamide, polyethylene terephthalate, polybutylene terephthalate, polyester, and polybutyrate adipate terephthalate; and/or the core polymer and/or the cladding polymer being any one of polyethylene, polypropylene, and a mixture thereof.

9. The method of claim 2, further comprising forming the core with a diameter of 50 to 600 micrometers, forming the cladding with a minimum thickness of 25 to 300 micrometers in all directions extending radially from the core, and forming each of the protrusions with a radial extension, measured from a perimeter of the core, of the thickness of the cladding plus 2 to 10 times a radius of the core.

10. The method of claim 1, being performed such that the deformed beads assume a diameter of less than 50 μm and/or a length of less than 2 mm.

11. The method of claim 1, the core polymer mixture being prepared free of at least one of the following components of the cladding: a wax, a dulling agent, a UV stabilizer, a flame retardant, an anti-oxidant, a fungicide, a pigment, and combinations thereof.

12. The method of claim 1, the core polymer being high-density polyethylene, HDPE, and the cladding polymer being linear low-density polyethylene, LLDPE.

13. The method of claim 1, the liquid core polymer mixture being at least a three-phase system, the thread polymer being immiscible with the core polymer, the core polymer mixture further comprising a compatibilizer, the preparing of the liquid core polymer mixture resulting in the beads being surrounded by the compatibilizer and immersed in the core polymer.

14. The method of claim 13, the thread polymer being immiscible with the cladding polymer, the coextruding further comprising bringing the liquid core polymer mixture and the liquid cladding polymer component into contact with each other such that a contact layer is formed between the liquid core polymer mixture and the liquid cladding polymer component, the contact layer comprising a mixture of the core polymer and the cladding polymer, the contact layer locally further comprising the compatibilizer as a third component of the mixture.

15. The method of claim 1, wherein:
the core polymer mixture comprises the thread polymer and an additional thread polymer combined in an amount of 1 to 30 percent by weight of the core polymer mixture; and/or
the core polymer mixture comprises a compatibilizer in an amount of 0 to 60 percent by weight of the core polymer mixture; and/or
the monofilament comprises the cladding polymer in an amount of 50-80 percent by weight of the monofilament.

16. The method of claim 1, the preparation of the liquid core polymer mixture comprising:
forming a base polymer mixture by mixing the thread polymer, with a compatibilizer;
heating the base polymer mixture;
extruding the base polymer mixture;
granulating the extruded base polymer mixture;
mixing the granulated base polymer mixture with the core polymer; and
heating the granulated base polymer mixture with the core polymer to form the liquid core polymer mixture.

17. The method of claim 1, the coextrusion being performed at working temperatures between 180 and 270° C.

18. The method of claim 1, the liquid core polymer mixture being at least a two-phase system comprising the thread polymer as a first one of the at least two phases and the liquid core polymer as a second one of the at least two phases, each of the at least two phases comprising a plurality of molecules of the respective polymer.

19. A method for producing an artificial turf, the method comprising:
generating an artificial turf fiber by performing the method for producing an artificial turf fiber according to claim 1,
incorporating the artificial turf fiber into an artificial turf backing, and
cutting the artificial turf fiber into sections such that cut surfaces are created which expose the contact layer.

20. The method of claim 1, wherein the contact layer comprises a transition zone where number densities of core polymer and cladding polymer molecules form a gradient.

21. A method for producing an artificial turf fiber, the method comprising:
preparing a liquid core polymer mixture, the core polymer mixture comprising a core polymer and a thread polymer forming beads within the core polymer;
coextruding the liquid core polymer mixture with a liquid cladding polymer component into a monofilament, the liquid core polymer mixture forming a cylindrical core, the liquid cladding polymer component forming a cladding encompassing the core, the cladding having a non-circular profile, the core polymer and/or the cladding polymer being any one of polyethylene, polypropylene, and a mixture thereof;
quenching the monofilament;
reheating the quenched monofilament;
stretching the reheated monofilament to deform the beads; and
providing one or more of the stretched monofilaments as the artificial turf fiber.

* * * * *